(12) United States Patent
Marcicki

(10) Patent No.: US 10,780,885 B2
(45) Date of Patent: Sep. 22, 2020

(54) VEHICLE SYSTEMS AND METHODS FOR ELECTRIFIED VEHICLE BATTERY THERMAL MANAGEMENT BASED ON ANTICIPATED POWER REQUIREMENTS

(71) Applicant: FORD GLOBAL TECHNOLOGIES, LLC, Dearborn, MI (US)

(72) Inventor: James Matthew Marcicki, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 15/355,102

(22) Filed: Nov. 18, 2016

(65) Prior Publication Data
US 2018/0141552 A1    May 24, 2018

(51) Int. Cl.
| | |
|---|---|
| B60W 30/18 | (2012.01) |
| H01M 10/617 | (2014.01) |
| H01M 10/625 | (2014.01) |
| H01M 10/633 | (2014.01) |

(52) U.S. Cl.
CPC .... *B60W 30/18009* (2013.01); *H01M 10/617* (2015.04); *H01M 10/625* (2015.04); *H01M 10/633* (2015.04); *B60W 2510/244* (2013.01); *B60W 2556/50* (2020.02); *H01M 2220/20* (2013.01)

(58) Field of Classification Search
CPC ..... B60W 30/18009; B60W 2510/244; B60W 2510/402; H01M 10/625; H01M 10/633; H01M 2220/20

USPC .......................................................... 701/22
See application file for complete search history.

(56) References Cited

U.S. PATENT DOCUMENTS

| | | | |
|---|---|---|---|
| 7,360,615 B2 | 4/2008 | Salman et al. | |
| 8,174,235 B2* | 5/2012 | Dyer | B60L 53/302 320/109 |
| 8,410,760 B2 | 4/2013 | Formanski et al. | |
| 8,600,598 B2* | 12/2013 | Simonini | H01M 10/625 701/22 |
| 8,970,173 B2 | 3/2015 | Kelty et al. | |
| 8,975,866 B2* | 3/2015 | McGrath | B60L 11/1809 320/109 |
| 9,340,121 B2* | 5/2016 | Schwarz | B60L 58/27 |
| 2010/0201203 A1* | 8/2010 | Schatz | H01Q 7/00 307/104 |
| 2012/0043943 A1* | 2/2012 | Dyer | B60L 11/1809 320/137 |
| 2012/0112531 A1* | 5/2012 | Kesler | H02J 50/12 307/9.1 |

(Continued)

FOREIGN PATENT DOCUMENTS

| | | |
|---|---|---|
| FR | 2988060 | 12/2015 |
| JP | 2006139963 | 6/2006 |

(Continued)

*Primary Examiner* — Atul Trivedi
(74) *Attorney, Agent, or Firm* — David Kelley, Esq.; Carlson, Gaskey & Olds, P.C.

(57) ABSTRACT

A method includes controlling an electrified vehicle based on a route selected for a desired thermal management of a battery. An electrified vehicle includes at least one battery and a control system configured with instructions for automatically controlling the electrified vehicle based on the route selected for the desired thermal management of the battery.

20 Claims, 4 Drawing Sheets

(56) References Cited

U.S. PATENT DOCUMENTS

| | | | | |
|---|---|---|---|---|
| 2012/0119576 | A1* | 5/2012 | Kesler | H02J 7/0047 |
| | | | | 307/10.1 |
| 2013/0151050 | A1* | 6/2013 | Cheng | B60L 3/0046 |
| | | | | 701/22 |
| 2015/0132616 | A1* | 5/2015 | Sahner | H01M 10/4257 |
| | | | | 429/50 |
| 2015/0274028 | A1* | 10/2015 | Payne | B60L 53/00 |
| | | | | 701/22 |
| 2015/0274030 | A1* | 10/2015 | Payne | B60L 58/25 |
| | | | | 701/22 |
| 2016/0059733 | A1* | 3/2016 | Hettrich | H04W 4/029 |
| | | | | 701/2 |
| 2016/0303990 | A1* | 10/2016 | Penilla | G06F 3/0488 |
| 2016/0325726 | A1* | 11/2016 | Liang | B60W 10/06 |
| 2016/0332616 | A1* | 11/2016 | Zhao | B60L 58/13 |
| 2017/0238258 | A1* | 8/2017 | Ramalho de Oliveira | |
| | | | | H04W 4/46 |
| | | | | 455/574 |
| 2018/0009330 | A1* | 1/2018 | Ricci | H02J 7/0068 |
| 2019/0140225 | A1* | 5/2019 | Inoue | H01M 10/613 |
| 2019/0315232 | A1* | 10/2019 | Ing | B60L 58/26 |

FOREIGN PATENT DOCUMENTS

| | | |
|---|---|---|
| JP | 2010243327 | 10/2010 |
| JP | 2015076898 | 4/2015 |

* cited by examiner

VEHICLE SYSTEMS AND METHODS FOR ELECTRIFIED VEHICLE BATTERY THERMAL MANAGEMENT BASED ON ANTICIPATED POWER REQUIREMENTS

TECHNICAL FIELD

This disclosure relates to electrified vehicles. An exemplary method of controlling an electrified vehicle battery thermal management system is based on route selection.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. There are many different types of electrified vehicles including battery electric (BEV), plug-in hybrid (PHEV), or full hybrid (FHEV). These vehicles rely on a high voltage traction battery to deliver electrified power to a vehicle propulsion system.

The rate at which power can be delivered to the propulsion system directly impacts vehicle acceleration, while the total energy stored in the battery directly impacts vehicle range. Temperature is also a factor that affects battery power capability. For example, battery power capability can be reduced during cold temperature operation in order to maintain the battery's long-term durability. Further, operating at certain high temperature thresholds can also result in reduction of capability to maintain long-term durability.

These factors create an ideal battery temperature range that is neither too hot nor too cold. Significant energy can be expended by a battery thermal management system to regulate the battery temperature within upper and lower temperature boundaries. This can adversely affect the vehicle range of a BEV and adversely affect the fuel economy of a PHEV or FHEV.

SUMMARY

A method according to an exemplary aspect of the present disclosure includes, among other things, controlling an electrified vehicle based on a route selected for a desired thermal management of a battery.

In a further non-limiting embodiment of the foregoing method, a desired destination is received based on a user input and one or more possible routes are determined for the desired destination.

In a further non-limiting embodiment of either of the foregoing methods, the possible routes are analyzed to determine traction power requirements.

In a further non-limiting embodiment of any of the foregoing methods, additional steps include estimating vehicle acceleration events required for a duration of each possible route and using estimated vehicle accelerations to calculate battery power delivery requirements.

In a further non-limiting embodiment of any of the foregoing methods, additional steps include determining a current battery thermal state when the desired destination is received.

In a further non-limiting embodiment of any of the foregoing methods, additional steps include determining whether the battery can meet all power demands of all drive cycles in the current battery thermal state for each possible route.

In a further non-limiting embodiment of any of the foregoing methods, additional steps include, if the battery can meet all power demands of all drive cycles in the current battery thermal state for each possible route, selecting a fastest or shortest route.

In a further non-limiting embodiment of any of the foregoing methods, additional steps include, if the battery cannot meet all power demands for each possible route, determining whether there is at least one drive cycle that would not require changes to the battery thermal state and, if there is such a drive cycle, selecting the at least one drive cycle.

In a further non-limiting embodiment of any of the foregoing methods, additional steps include, if there is not a drive cycle that can operate without requiring changes to the battery thermal state, determining which possible route can be achieved with a minimum heating or cooling rate such that battery temperature will allow all power demands when required for the possible route, and selecting said possible route.

In a further non-limiting embodiment of any of the foregoing methods, additional steps include referring to a tabulated set of thermal system performance data to select the minimum heating or cooling rate required to satisfy expected power requirements for said possible route.

In a further non-limiting embodiment of any of the foregoing methods, the electrified vehicle comprises an autonomous vehicle.

A method according to another exemplary aspect of the present disclosure includes, among other things, directing a vehicle to take a route, among a plurality of possible routes, which avoids changes to a battery thermal state.

In a further non-limiting embodiment of any of the foregoing methods, additional steps include analyzing possible routes to determine traction power requirements, determining whether a battery can meet all power demands of all drive cycles in a current battery thermal state for each possible route, determining if there is at least one drive cycle that would not require changes to the battery thermal state, and if the battery can meet all power demands of all drive cycles in the current battery thermal state for each possible route, selecting a fastest or shortest route.

In a further non-limiting embodiment of any of the foregoing methods, additional steps include, if the battery cannot meet all power demands of all drive cycles in the current battery thermal state for each possible route, selecting one of the following possible routes: selecting a first route from the possible route where the first route comprises the drive cycle that would not require changes to the battery thermal state, or selecting a second route from the possible routes wherein, if there is not a drive cycle that can operate without requiring changes to the battery thermal state, and wherein selection of the second route includes determining which possible route can be achieved with a minimum heating or cooling rate such that battery temperature will allow all power demands when required for the second route.

In a further non-limiting embodiment of any of the foregoing methods, the vehicle comprises an autonomous electrified vehicle.

An electrified vehicle according to an exemplary aspect of the present disclosure includes, among other things, at least one battery; and a control system configured with instructions for automatically controlling the electrified vehicle based on a route selected for a desired thermal management of the battery.

In a further non-limiting embodiment of the foregoing electrified vehicle, the vehicle includes a vehicle navigation system wherein the control system receives a desired destination based on an input to the navigation system and determines one or more possible routes for the desired destination.

In a further non-limiting embodiment of either of the foregoing electrified vehicles, the vehicle includes one or more sensors that measure and transmit vehicle and battery characteristics to the control system to determine a current battery thermal state when the desired destination is received by the control system, and wherein the control system determines whether the battery can meet all power demands of all drive cycles in the current battery thermal state for each possible route, and if the battery can meet all power demands of all drive cycles in the current battery thermal state for each possible route, the a fastest or shortest route is selected by the control system.

In a further non-limiting embodiment of any of the foregoing electrified vehicles, when the control system determines that the battery cannot meet all power demands of all drive cycles in the current battery thermal state for each possible route, the control system determines whether there is at least one drive cycle that would not require changes to the battery thermal state and, if there is such a drive cycle, the control system selects the at least one drive cycle, and if there is not a drive cycle that can operate without requiring changes to the battery thermal state, the control system determines which possible route can be achieved with a minimum heating or cooling rate such that battery temperature will allow all power demands when required for the possible route, and selecting said possible route.

In a further non-limiting embodiment of any of the foregoing electrified vehicles, the electrified vehicle comprises an autonomous vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle systems and methods for controlling electrified vehicles in a manner to improve the efficiency of thermal management of a battery. An exemplary method includes controlling an electrified vehicle based on a route selected for a desired thermal management of a battery. Another exemplary method includes controlling an electrified vehicle based on a selected route for a desired thermal management of a battery, wherein the controlling includes determining a plurality of possible routes based on a desired destination, determining a current battery thermal state when the desired destination is received, and determining if there is at least one drive cycle in the possible routes that would not require changes to the battery thermal state. These and other features are discussed in greater detail in the following paragraphs of this detailed description.

Figure 1A:
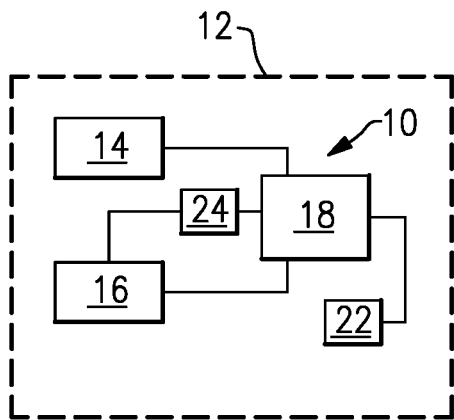
FIG. 1A is a schematic representation of a battery electric vehicle.
Figure 1B:
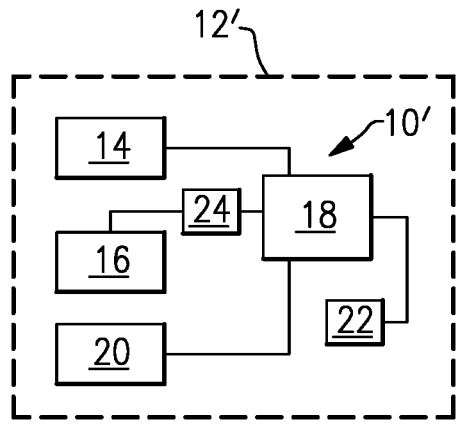
FIG. 1B is a schematic representation of a hybrid electric vehicle.

FIG. 1A schematically illustrates a powertrain 10 of an electrified vehicle 12 comprising a battery electric vehicle (BEV) while FIG. 1B schematically illustrates a powertrain 10' of an electrified vehicle 12' comprising a hybrid electric vehicle (HEV). Although FIGS. 1A-1B are depicted as a BEV and a HEV, it should be understood that the concepts described herein are not limited to BEV's and HEV's and could extend to other types of electrified vehicles, including, but not limited to, plug-in hybrid electric vehicles (PHEV's).

In a non-limiting embodiment shown in FIG. 1A, the powertrain 10 for the BEV includes at least one electric machine 14, a battery pack 16, and a control system 18 that cooperate to power the electrified vehicle 12. In a non-limiting embodiment shown in FIG. 1B, the powertrain 10' includes at least one electric machine 14, a battery pack 16, a control system 18, and an engine 20 that cooperate to power the electrified vehicle 12'. It should be understood that the configurations shown in FIGS. 1A and 1B are highly schematic and that other components such as additional electric machines, transmissions, gear sets, etc. in various combinations could also be included in the powertrains.

In each configuration, a vehicle navigation system 22 communicates with the control system 18. The control system 18 receives a desired destination for the vehicle based on an input to the navigation system 22 and determines one or more possible routes for the desired destination. One or more sensors 24 measure and transmit environmental, vehicle, and/or battery characteristics (such as battery temperature, atmospheric temperature, passenger cabin temperature, etc. for example) to the control system 18 to determine a current battery thermal state when the desired destination is received by the control system 18. The control system 18 then analyzes the current battery thermal state in relation to the possible routes and selects a route to maximize battery performance. This will be discussed in greater detail below.

It should be understood that the control system 18 is configured with hardware and software with instructions for automatically controlling the electrified vehicle to maximize battery performance. The control system 18 can comprise a dedicated control system for thermal management of the battery 16 or can be incorporated into the main control system for the electrified vehicle 12. The control system 18 includes memory, processors, communication links, etc. such that data processing and calculating steps can be performed and communicated internally and externally with the computer of the vehicle. One of ordinary skill in the art would be able to configure such a control system to perform the methods and processes described below.

As discussed above, the control system 18 analyzes a current battery thermal state in relation to the possible routes and selects a route to maximize battery performance. The rate at which power can be delivered to propel the vehicle directly impacts vehicle acceleration, while the total energy stored in the battery 16 directly impacts vehicle range. Temperature is also a factor that affects battery power capability. Battery power capability can be reduced during cold or high temperature operation in order to maintain the battery's long-term durability. As such, there is an ideal battery temperature range to maximize overall performance. Significant energy can be expended by a battery thermal management system to regulate the battery temperature within upper and lower temperature boundaries. This can adversely affect the vehicle range of a BEV and adversely affect the fuel economy of a PHEV or FHEV.

Figure 2:
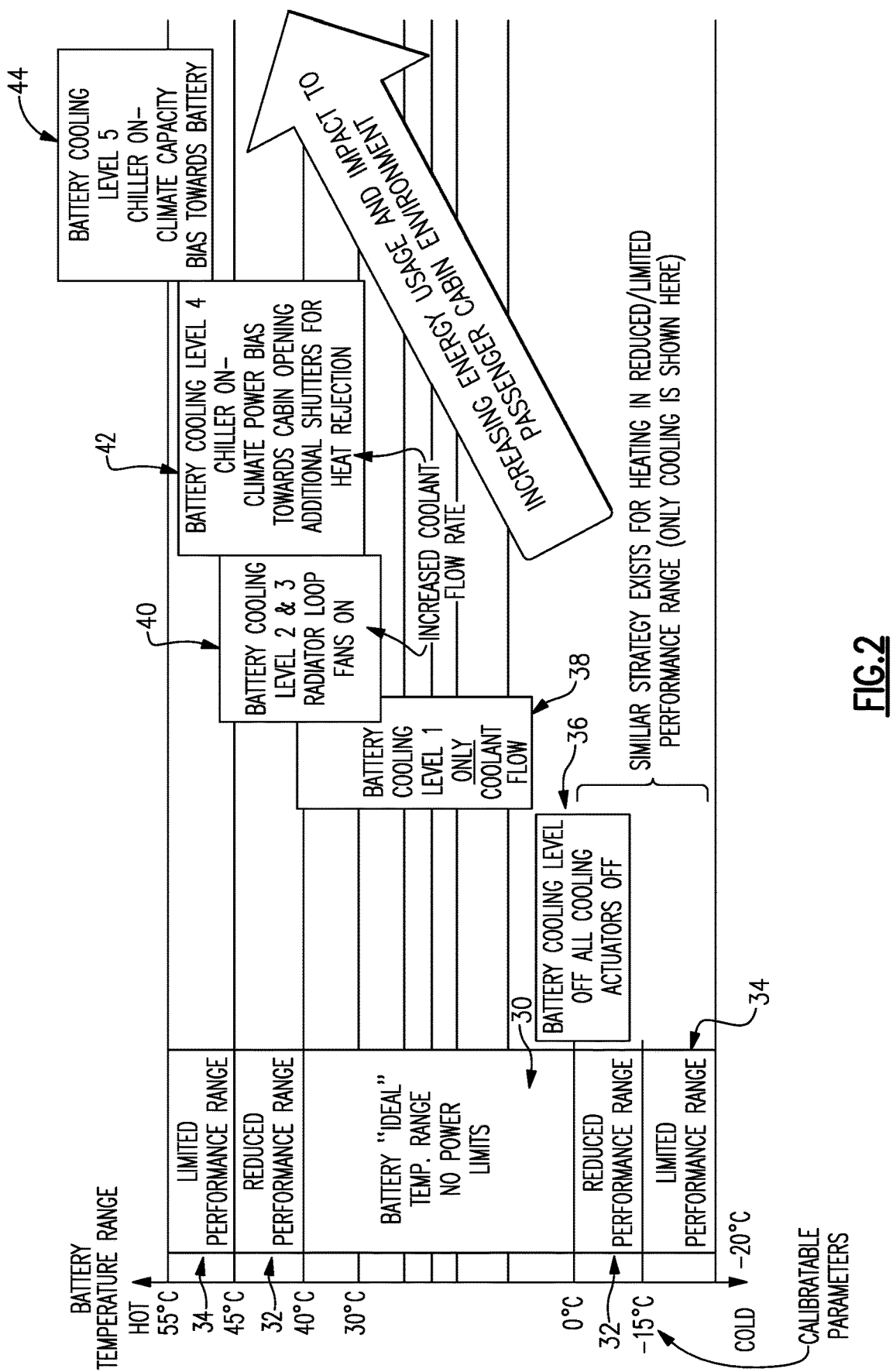
FIG. 2 schematically illustrates battery temperature ranges for a battery cooling strategy for an electrified vehicle.

FIG. 2 shows an example of a battery temperature range and cooling strategy. In a non-limiting embodiment, an example ideal battery temperature range 30 is identified as being between zero degrees Celsius and 40 degrees Celsius. Examples of reduced performance ranges 32 are identified as being between zero to −15 degrees Celsius and between 40 to 45 degrees Celsius. Examples of limited performance ranges 34 are identified as being between −15 to −20 degrees Celsius and between 45 to 55 degrees Celsius. It should be understood that while FIG. 2 only shows a cooling strategy, a similar strategy exists for heating in reduced 32 and limited 34 performance ranges. Further, the identified temperature ranges are merely examples, and it should be understood that other temperature ranges could be applicable dependent upon vehicle application and operating conditions.

When the battery 16 is within the ideal temperature range 30, there are no power limits and battery cooling level is OFF and all cooling actuators are OFF as indicated at 36. When energy level requirements increase while the battery 16 is within the ideal temperature range 30, battery cooling enters a Level 1 phase where only coolant flows as indicated at 38. As further energy is required, and as the battery moves into reduced 32 and limited 34 performance ranges, the battery cooling strategy moves through increasing cooling levels. Battery cooling Levels 2-3 initiate radiator loop cooling and have fan cooling ON as indicated at 40. As such, there is an increased coolant flow rate at this level. Battery cooling Level 4 activates a chiller as indicated at 42. There is thus an increased coolant flow rate and, optionally, there may be opening of additional shutters for heat rejection. Battery cooling Level 5 activates the chiller and biases climate power toward the battery 16 as indicated at 44 when the battery moves into the limited performance range 34.

In hot or cold climates, the battery temperature range may be outside the range for full capability even immediately after a key-on sequence following a parking period of time. In this example, a thermal management system of the control system 18 immediately begins regulating the battery temperature upon key-on. Under certain conditions, in particular for consecutive short distance trips, the duration of heating or cooling is too short to cause any meaningful impact to vehicle drivability but represents a significant auxiliary load that causes decreased range.

The subject control system 18 addresses this issue by determining a minimum heat energy to displace that would meet battery power demands for a specific driving cycle thereby increasing the total energy efficiency of an electrified vehicle. Additional control logic and communications hardware are implemented within the control system 18 to determine the most energy efficient path and to select the corresponding thermal management strategy. This application would be particularly useful for autonomous (driverless, self-driving, robotic driving, etc.) electrified vehicles where the control system 18 automatically selects every route for every drive cycle based on a user input destination. Additionally, driving behavior such as acceleration and braking can be strictly controlled by the control system 18 and therefore battery power demands are made more predictable than would occur with a non-autonomous vehicle.

Figure 3:
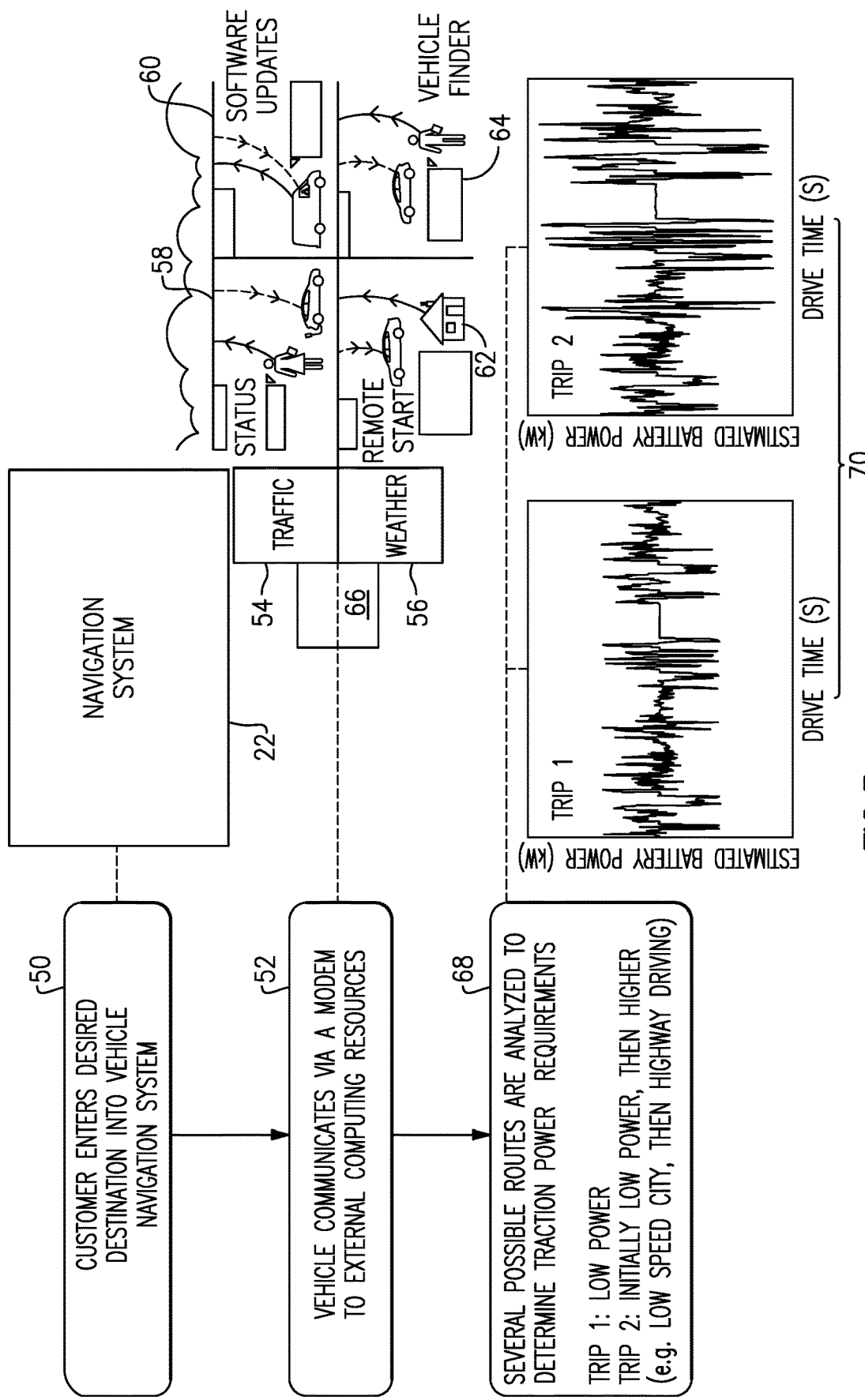
FIG. 3 illustrates a vehicle control strategy for controlling an electrified vehicle in a manner in relation to predicted routes based on a user input destination.
Figure 4:
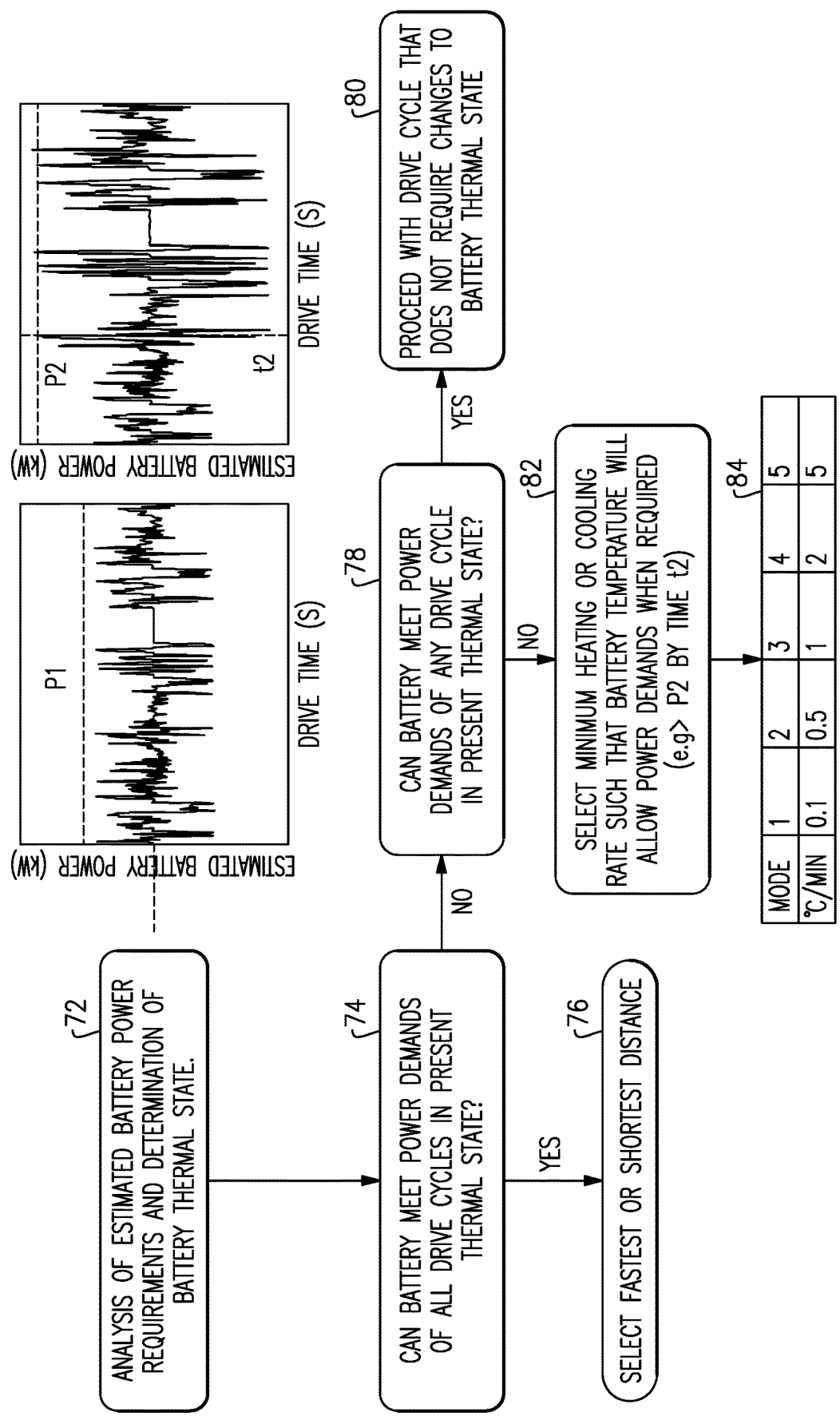
FIG. 4 illustrates additional steps for the vehicle control strategy for controlling the electrified vehicle in a manner based on which selected route achieves a desired thermal management protocol for a battery.

In a non-limiting embodiment shown in FIGS. 3-4, a method is disclosed that controls an electrified vehicle based on a route selected for a desired thermal management of a battery. In one example, a user input from a customer, passenger, or operator is entered into the vehicle navigation system 22 as indicated at 50 in FIG. 3. The navigation system 22 analyzes several possible routes and communicates via a modem or other similar device with a cloud or other similar external computing resource as indicated at 52. The external computing resources can include information such as traffic 54, weather 56, vehicle status 58, and software updates 60, for example; as well as including other features such as remote start 62 and vehicle finder 64 capabilities, for example. Additionally, the computing resources include a database 66 of travel information including, for example, speed limits for the roads to be traveled and information regarding changes in elevations such as climb and descent portions of the road.

Once a desired destination is entered, the control system 18 identifies several possible routes leading from the current location to the desired destination. The control system 18 accesses all of the information available via the computing resources and performs an analysis to estimate the vehicle acceleration events that will be required for the duration of each route, which are then used to calculate battery power delivery or traction power requirements as indicated at 68. In one example, a very simple vehicle model could be used with a limited set of dynamic equations describing the power required for acceleration. In another example, a more complex model containing a plurality of coupled ordinary or partial differential equations, or differential algebraic equations, could be used.

In one example analysis shown at 70 in FIG. 3, there are two possible trips, e.g. Trip 1 and Trip 2, which are selected as possible routes. Each trip has an estimated battery power (kW) versus drive time (s) series data, which is displayed visually as a graph. Trip 1 comprises a low power trip while Trip 2 initially has low power but then transitions into higher power requirements. An example route for Trip 2 would involve initial low speed city driving followed by highway driving.

The control system 18 analyzes the estimated battery power requirements for each trip, and determines a current battery thermal state as indicated at 72 in FIG. 4. The current battery thermal state is determined when the desired destination is received by the control system 18. Further, the control system 18 uses at least one or more of the various sensors 24 and other computing resources to determine the current battery thermal state.

In one example, the control system 18 next determines whether the battery 16 can meet all power demands of all drive cycles in the current battery thermal state for each possible route as indicated at 74. If the battery 16 can meet all power demands of all drive cycles in the current battery thermal state for each possible route, then the control system 18 selects a fastest or shortest route as indicated at 76. If it is determined that the battery 16 cannot meet all power demands of all drive cycles in the current battery thermal state for each possible route, the control system 18 determines whether there is at least one drive cycle that would not require changes to the battery thermal state as indicated at 78. If there is such a drive cycle, then the control system 18 selects this drive cycle that does not require changes to the battery thermal state as indicated at 80.

If there is not a drive cycle that can operate without requiring changes to the battery thermal state, the control system 18 determines which possible route can be achieved with a minimum heating or cooling rate such that battery temperature will allow all power demands when required for the possible route as indicated at 82. For example, if Trip 2 was selected, a cooling rate would have to be selected to allow for required power P2 by time T2 (see Trip 2 in FIG. 4).

The control system 18 compares the initial battery temperature and corresponding power capabilities with the navigation-based battery power requirements. A tabulated set 84 of thermal system performance data, in terms of degree Celsius change in battery temperature per minute, for example, is used to select the minimum heating or cooling rate required to satisfy expected power requirements for the possible route. This data may also need to be characterized for multiple initial temperatures. Alternatively, a dynamic model of the heat generated by the battery during the drive cycle, and the heat displacement rate of the possible heating and cooling modes, in Watts for example, can be used to determine the minimum required rate. These determinations can be made either by the control system 18 or by an external computing resource.

Typically, a lower heating or cooling rate will mean a lower overall energy consumption. In one example, a high power acceleration may be required near the end of a trip, which would enable a lower heating or cooling rate than a high power acceleration required shortly after a key-on event. This would allow the battery pack to operate safely and efficiently in a temperature region that would normally expend energy for thermal management.

Figure 5:
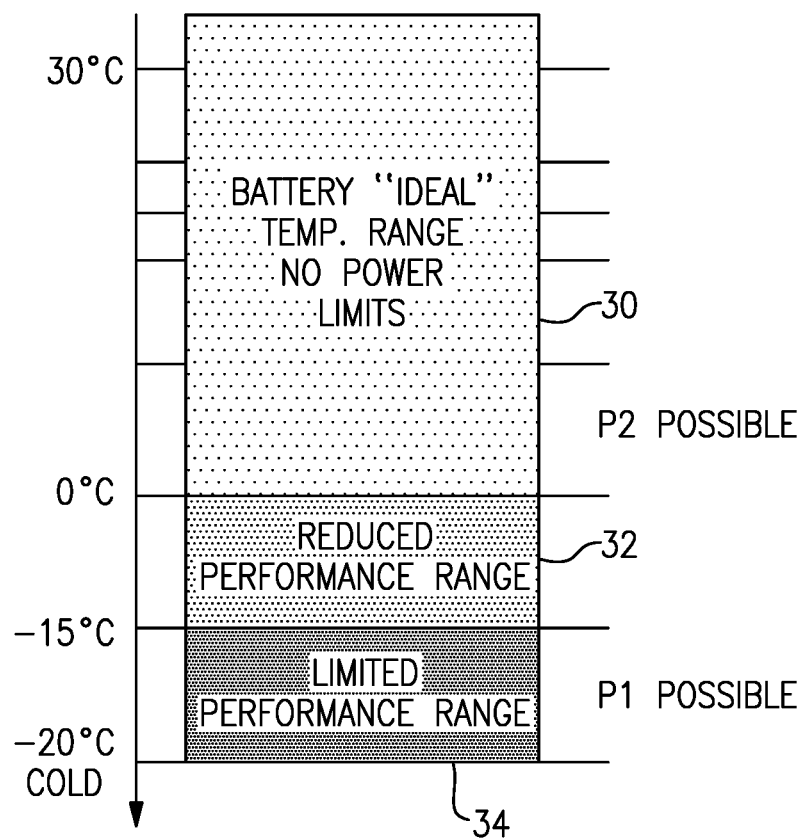
FIG. 5 schematically illustrates a battery temperature range for example routes from FIG. 4.

One such example is shown in FIG. 5. As shown in FIG. 5, the example ideal battery temperature range 30 is identified as being between zero degrees Celsius and at least 30 degrees Celsius. The reduced performance range 32 is identified as being between zero to −15 degrees Celsius and the limited performance range 34 is identified as being between −15 to −20 degrees Celsius. In one disclosed example, there is an assumption of an initial vehicle temperature of −20 degrees Celsius. As Trip 2 requires peak power P2, this implies that the battery must be in the ideal range 30. Trip 1 only requires peak power P1, which needs the battery 16 to be in the limited performance range 34. The control system 18 selects Trip 1 as no change in battery thermal state is required, i.e. the temperature is already at −20 degrees Celsius which is within the limited performance range 34.

This means that for Trip 1 no active thermal management is required. A reduction in energy usage of 8.5% can thus be achieved, which improves round-trip range. This example would be determined using the following information: a specified type of electrified vehicle with an identified number of battery cells, a specified heat capacity of the system, a 15 degree Celsius change required between the limited and ideal battery performance, a 50% thermal system efficiency, and 23 kWh battery pack energy.

The subject method and system of controlling an electrified vehicle based on a route selected for a desired thermal management of a battery improves overall battery efficiency and increase the range of the vehicle. As discussed above, the method and system are particularly beneficial for autonomous vehicles; however, non-autonomous vehicles could also utilizes the subject methods and systems. However, in such non-autonomous vehicles the driver may choose not to use the selected route therefore bypassing the benefits.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   determining a plurality of possible routes for a desired destination based on an input to a navigation system; and
   controlling an electrified vehicle based on a route selected from the plurality of possible routes to achieve a desired thermal management of a battery.

2. The method as recited in claim 1, wherein the desired destination is based on a user input to the navigation system and including determining the possible routes for the desired destination after the user input is received.

3. The method as recited in claim 2, comprising analyzing the possible routes to determine traction power requirements.

4. The method as recited in claim 3, comprising estimating vehicle acceleration events required for a duration of each possible route and using estimated vehicle accelerations to calculate battery power delivery requirements.

5. The method as recited in claim 3, comprising determining a current battery thermal state when the desired destination is received.

6. The method as recited in claim 5, comprising determining whether the battery can meet all power demands of all drive cycles in the current battery thermal state for each possible route.

7. The method as recited in claim 6, comprising, if the battery can meet all power demands of all drive cycles in the current battery thermal state for each possible route, selecting a fastest or shortest route.

8. The method as recited in claim 6, comprising, if the battery cannot meet all power demands for each possible route, determining whether there is at least one drive cycle that would not require changes to the battery thermal state and, if there is such a drive cycle, selecting the at least one drive cycle.

9. The method as recited in claim 8, comprising, if there is not a drive cycle that can operate without requiring changes to the battery thermal state, determining which possible route can be achieved with a minimum heating or cooling rate such that battery temperature will allow all power demands when required for the possible route, and selecting said possible route.

10. The method as recited in claim 9, comprising referring to a tabulated set of thermal system performance data to select the minimum heating or cooling rate required to satisfy expected power requirements for said possible route.

11. The method as recited in claim 1, wherein the electrified vehicle comprises an autonomous vehicle.

12. A method, comprising:
   determining a plurality of possible routes for a desired destination based on an input to a navigation system; and
   directing a vehicle to take a route, selected from among the plurality of possible routes, that avoids changes to a battery thermal state.

13. The method as recited in claim 12, wherein the desired destination is based on a user input to the navigation system and including determining the possible routes for the desired destination after the user input is received, and further comprising analyzing possible routes to determine traction power requirements, determining whether a battery can meet all power demands of all drive cycles in a current battery thermal state for each possible route, determining if there is at least one drive cycle that would not require changes to the battery thermal state, and if the battery can meet all power demands of all drive cycles in the current battery thermal state for each possible route, selecting a fastest or shortest route.

14. The method as recited in claim 13, comprising, if the battery cannot meet all power demands of all drive cycles in the current battery thermal state for each possible route, selecting one of the following possible routes:
   selecting a first route from the possible routes where the first route comprises the drive cycle that would not require changes to the battery thermal state, or
   selecting a second route from the possible routes wherein, if there is not a drive cycle that can operate without requiring changes to the battery thermal state, and wherein selection of the second route includes determining which possible route can be achieved with a minimum heating or cooling rate such that battery temperature will allow all power demands when required for the second route.

15. The method as recited in claim 12, wherein the vehicle comprises an autonomous electrified vehicle.

16. An electrified vehicle, comprising:
   at least one battery; and
   a control system configured with instructions for determining a plurality of possible routes for a desired destination based on an input to a navigation system, and automatically controlling the electrified vehicle based on a route selected from the plurality of possible routes to achieve a desired thermal management of the battery.

17. The vehicle as recited in claim 16, wherein the control system receives the desired destination based on a user input to the navigation system and wherein the control system determines the possible routes for the desired destination after the user input is received.

18. The vehicle as recited in claim 17, including one or more sensors that measure and transmit vehicle and battery characteristics to the control system to determine a current battery thermal state when the desired destination is received by the control system, and wherein the control system determines whether the battery can meet all power demands of all drive cycles in the current battery thermal state for each possible route, and if the battery can meet all power demands of all drive cycles in the current battery thermal state for each possible route, the a fastest or shortest route is selected by the control system.

19. The vehicle as recited in claim 18, wherein when the control system determines that the battery cannot meet all power demands of all drive cycles in the current battery thermal state for each possible route, the control system determines whether there is at least one drive cycle that would not require changes to the battery thermal state and, if there is such a drive cycle, the control system selects the at least one drive cycle, and
   if there is not a drive cycle that can operate without requiring changes to the battery thermal state, the control system determines which possible route can be achieved with a minimum heating or cooling rate such that battery temperature will allow all power demands when required for the possible route, and selecting said possible route.

20. The vehicle as recited in claim 17, wherein the electrified vehicle comprises an autonomous vehicle.

\* \* \* \* \*